Patented Aug. 25, 1936

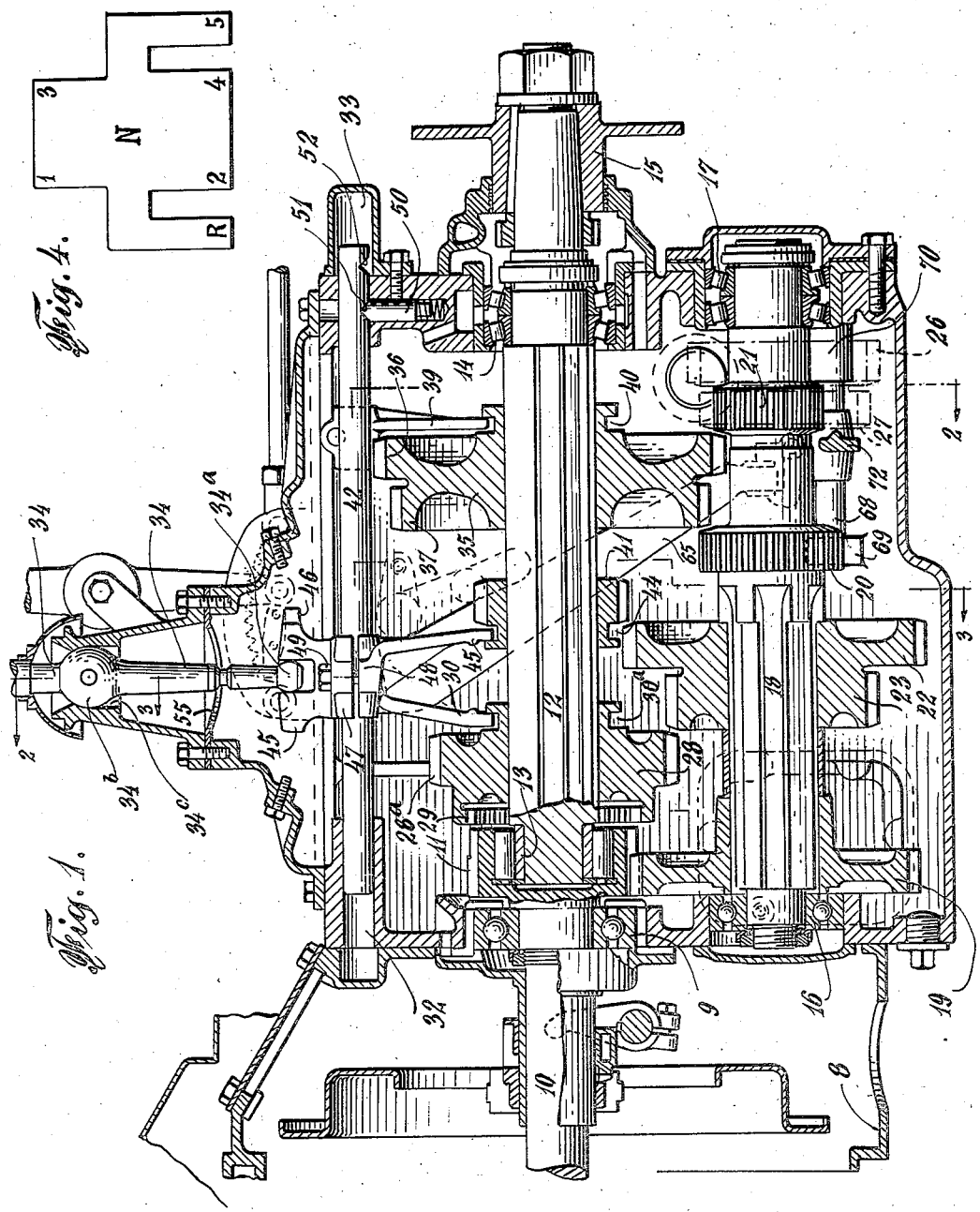

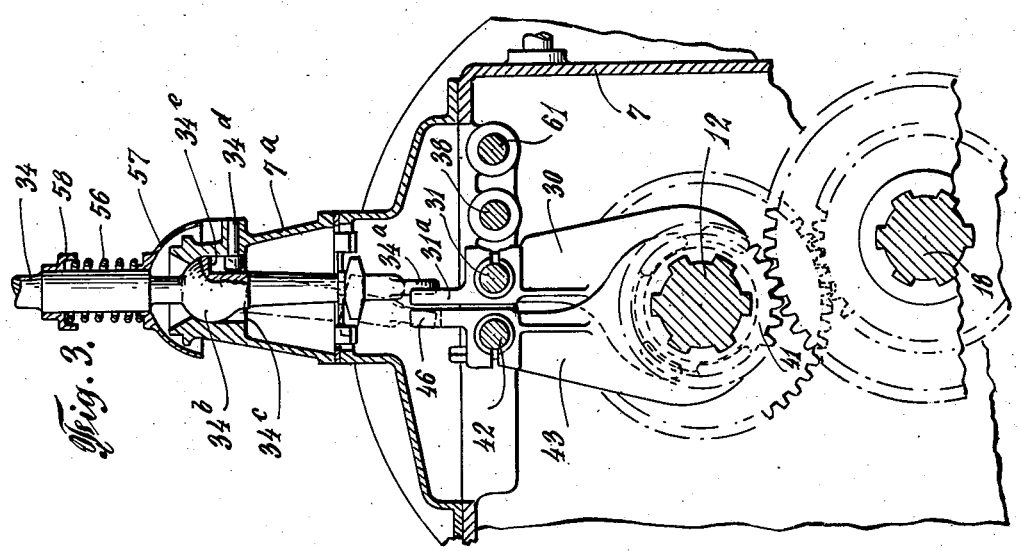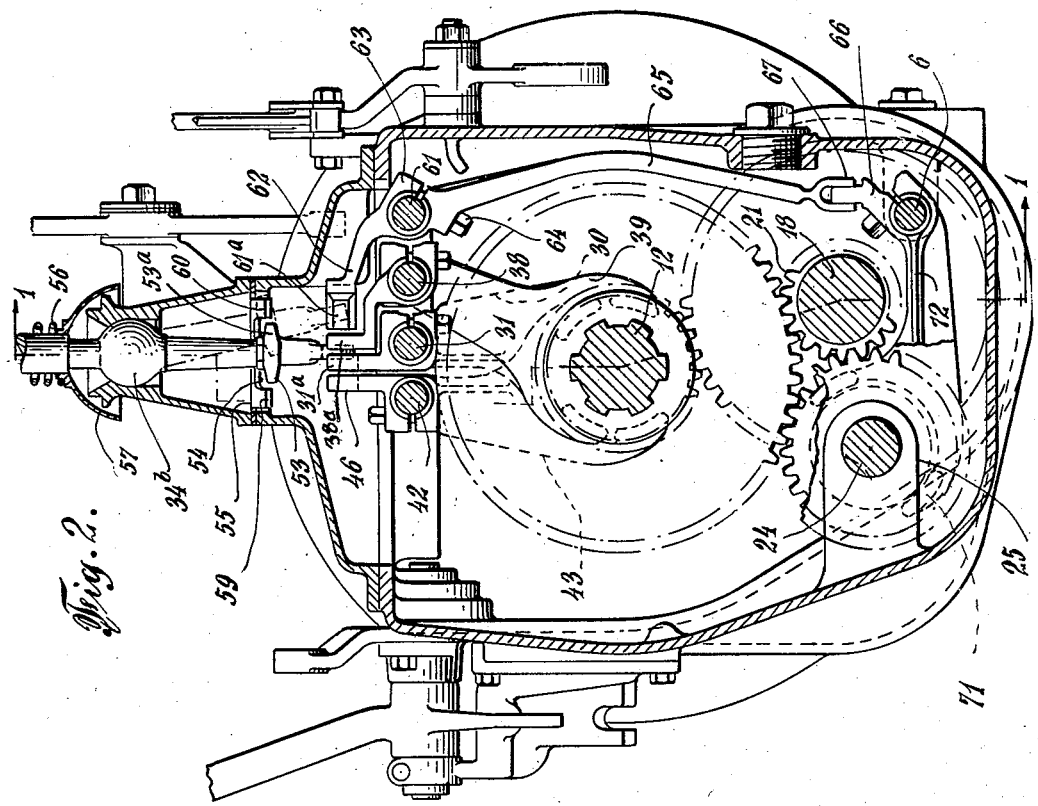

2,051,980

UNITED STATES PATENT OFFICE 2,051,980

POWER TRANSMITTING DEVICE

Benjamin B. Bachman, Philadelphia, Pa., assignor to The Autocar Company, Ardmore, Pa., a corporation of Pennsylvania Application December 22, 1932, Serial No. 648,330

7 Claims. (Cl. 74—473)

This invention relates generally to the transmission of power and is more particularly directed to a mechanism of the gear type, as employed in transmitting the torque of an internal combustion engine to the work to be performed thereby, as in engine-driven vehicles, and means for effecting changes in the gears engaged for obtaining different vehicle operating speeds.

More specifically, the invention contemplates the provision of so-called gear-sets or change speed gearing of the sliding type, customarily utilized in the construction of motor-driven road vehicles, wherein the speed ranges are increased, without substantially changing the construction of such transmission or deviating from the conventional manual gear shifting movements.

As is well known, the standard motor vehicle transmission embodies suitable gearing, slidably and selectably interengageable for obtaining three forward driving speeds and a reverse speed, the several relative gear movements that are essential for changing from one speed to another being accomplished by the manipulation of a single shifting lever, the direction and the sequence of the lever movements being also standardized. In certain constructions, gearing to provide for a fourth forward speed has been incorporated in the transmission, while in several instances, structures of more or less complicated and cumbersome design have been proposed to further increase the driving ranges.

In these latter attempts to step up the number of speeds obtainable, various expedients have been resorted to, as supplementary gear trains, auxiliary gear systems and the like, interconnectable with the main transmission or otherwise associated therewith, the additional gearing generally requiring independent controlling media, so that any advantages that might flow from the extra speed ranges made available, are offset by the necessity for manipulating the independent control devices, as a second shift lever, supplementary to the main transmission shift lever. This multiplication of the shifting operations, apart from the necessity of actuating two levers for effecting certain speed changes, obviously, imposes considerable hardship upon the vehicle operator, his difficulties being further increased by the fact that there has practically been no attempt to conform the lever movements to the standard shifting diagram or directional movements. Manifestly, such more or less radical and arbitrary departure from the conventional mode of operation is creative of a driving hazard and tends to greatly hamper the economical disposition or assignment of operators in the management of fleets of vehicles having the standard and the non-standard type of gear shifting media, it being evident that an operator accustomed to one could not be transferred to the operation of a vehicle having the other type of shifting means, with any assurance of satisfactory service. Thus, it will be readily evident, that, apart from the complicated and costly constructions of these so-called stepped-up transmissions, their use is not commercially feasible, due mainly to the afore-described obstacles to operation.

Therefore, the general object of this invention is the provision of a mechanism of the slidable gear type for transmitting power from the source of the work to be performed, which will make available a greater number of speed changes than are obtained in standard transmission designs of that type, and, at the same time, eliminate all of those disadvantages which are inherent to existing and proposed so-called extra speed change gear transmission mechanisms, as hereinbefore pointed out, both structurally and in use, thereby, obviously, increasing the potential field of utility of such mechanisms.

More especially, it is an important object of this invention to provide a gear set or transmission of the slidable gear type, as aforesaid, which is especially adapted to the requirements of motor-vehicle construction and operation, due to low production and installation costs, coupled with simplified operation, the structure of my transmission being such as to admit of its incorporation in standard vehicle designs without effecting the more or less substantial assembly and dimensional changes that would be required for the embodiment therein of those expedients which have been proposed for obtaining greater flexibility in operation, as heretofore pointed out.

A further object of this invention is to make available a gear set or transmission of a construction to provide for speed changes in excess of the maximum number that may be attained in transmissions of standard design, possessing the characteristics and advantages hereinbefore set forth, wherein the gear changes throughout the entire speed range thereof may be effected by the actuation of a single control or gear shifting lever, the movements of which are analogous to its counterpart in the standard transmission, thus providing for the utilization of a conventional shift diagram, whereby an operator versed in the manipulation of the shift lever of the standard type of transmission may readily function my construction in all of its speed ranges, the movements of the shifting lever for the extra speeds conforming directionally to those with which the operator is familiar in his handling of the standard gear set.

Briefly stated, it is my purpose, as will be evident from the foregoing, to provide a transmission of the slidable gear type which, while conforming as closely as possible in every way to the standard type of transmission, will embody additional gears to obtain another speed ratio so incorporated in the gear set that the complicated and cumbersome mechanisms now resorted to in attaining extra speed ratios may be entirely dispensed with, together with the separate actuating devices that their use makes necessary and which render the operation of vehicles having such devices more or less involved or complicated to an extent which is a decided detriment in vehicular operation. By the mechanisms which I use for actuating the slidable gears into their pre-determined functioning positions for the different speeds, I am enabled to overcome all those disadvantages that flow from the use of a second shift lever and at the same time make it possible to provide for directional movements of my single shifting lever that are recognized as conventional in changing from one speed to another, thereby obviating the possibility of confusion, with a resultant driving hazard that is present in every instance where an operator accustomed to the standard transmission is called upon to drive a vehicle having one of the existing extra speed types. As will be manifest, in the operation of fleets of commercial vehicles, the inability to transfer an operator from a vehicle having a standard gear set to one wherein the transmission embodies present types of extra speed mechanism in an emergency, or otherwise, is a serious disadvantage and often presents an economic problem that has caused many fleet owners to deny themselves the recognized advantages in many forms of service that vehicles having the extra speed possess.

Other objects and advantages flowing from the practicing of my invention will doubtless present themselves as the description proceeds and I would have it clearly understood that I reserve unto myself all rights to the full range of equivalents, both in structure and in use, to which I may be entitled under my invention in its broadest aspect.

For the purpose of the present disclosure, I have elected to show and describe my invention as it may be utilized in the provision of a transmission for motor vehicles, as trucks, buses and the like, as well as other passenger cars. However, this is merely illustrative, and is not to be construed in any sense as a limitation of the scope of my invention which may take other forms and is susceptible of a wide range of application, within the purview of the appended claims.

In the drawings:

Fig. 1 is a vertical longitudinal section of a transmission mechanism embodying my invention, taken on the line 1—1 of Fig. 2, the gears being in the so-called neutral position.

Fig. 2 is a vertical transverse section on the line 2—2 of Fig. 1, showing the gears engaged for reverse speed.

Fig. 3 is a vertical cross-section taken on the line 3—3 of Fig. 1, showing gears engaged for overspeed.

Fig. 4 is a diagram of the positions which are assumed by the gear-shifting lever for functioning the transmission in the various speed ratios thereof.

Referring now to the drawings in detail, wherein like reference characters are employed to designate similar parts in the several views, 7 indicates the usual gear housing or casing, the forward end of which may include or be adapted to register with the conventional clutch housing 8, to be secured thereto by the usual bolts.

Journaled in suitable bearings, as at 9, at the forward or front end of the gear-set housing 7 is the drive shaft 10 which may form the stem of the driving pinion 11, or the latter may be keyed to said shaft, for rotation therewith, in any suitable manner, in conformity with standard practice.

Coaxially alined with the drive shaft 10 is the driven shaft 12 supported in bearings 13 and 14, preferably as shown, or of any other suitable type or design, the rear end of said driven shaft being tapered or otherwise adapted to receive the usual flanged sleeve 15 for coupling said shaft to the propeller shaft, through the medium of the complemental flange of the customary universal joint fitting.

Mounted below and parallel to the coaxially alined shafts 10 and 12, in suitable bearings 16 and 17 at the front and rear ends of the housing 7 is the countershaft 18 carrying the single gears 19, 20 and 21 and a double gear embodying major and minor diameter portions 22 and 23, respectively, this latter gear, with the gears 19 and 20 between which it is located and the gear 21, being keyed or otherwise fixed to said shaft against relative longitudinal movement.

A stub shaft 24 supported in brackets, as at 25, at each end, which is opposite to the left of the vertical axis of the transmission, when looking toward the front thereof carries an idler which, as shown in phantom in Fig. 1, is a double gear comprising major and minor diameter portions 26 and 27, respectively, this idler functioning in the reverse speed ratio of the construction, as hereinafter described.

Mounted upon the driven shaft 12, adjacent its forward end, for sliding movement longitudinally thereof, I provide a combination or double gear 28 having external teeth 28ª and internal teeth 29 adapted to mesh with the driving pinion or gear 11, as will be explained, this so-called combination gear, being of the usual grooved hub design to provide a collar 30ª within which the arms of the bifurcated member or actuating fork 30 dependent from the shift bar 31 are retained, the said bar being slidable within bearings located at each end of the housing 7 in response to the movement of the normally actuatable shifting lever 34.

A second double gear, 35, having major and minor diameter portions, both formed with external teeth as at 36 and 37, is likewise slidable on said driven shaft 12 in response to the actuation of the slide rod 38, the dependent fork 39 of which is in engagement with the collar or hub groove 40 of said latter gear.

Also mounted upon said driven shaft 12 for relative longitudinal movement, between the gears 28 and 35 is an externally toothed gear 41 which is shiftable into and out of functioning position, for the purposes hereinafter set forth, by the reciprocation of the rod 42 in its bearings 32 and 33, with its dependent fork or bifurcated member 43 in engagement with the hub groove or collar 44 of said gear.

The aforementioned gears 28 and 35 are each shiftable from their respective neutral or non-effective positions on the shaft 12 (Fig. 1) in two directions, fore and aft, the rearward movement of the gear 35 meshing its teeth 36 with the gear 21 on the counter-shaft 18 thus transmitting the engine torque through the pinion 11 and counter-shaft gear 19, which are in constant mesh, and from the gear 21 to the meshed teeth 36 of the gear 35 to the driven shaft 12, and producing the first or lowest forward speed ratio of my construction, while the forward movement of said gear 35 engages its teeth 37 with those of the gear 20 for the second forward speed, the power being transmitted from the pinion 11 to the counter-shaft and from the gear 20 to the gear 35 and the driven shaft. Similarly, the backward movement of the gear 28 meshes its external teeth 28a with the counter-shaft gear 23, the drive then being through the pinion 11 to the counter-shaft and from the gear 23 thereon to the gear 28 to obtain the third forward speed ratio, the forward movement of said gear 28 meshing its internal teeth 29 with the pinion 11 for transmitting the power from the driving shaft 10 directly to the shaft 12 for the fourth speed.

As in standard transmission designs, the aforesaid shift lever 34 is mounted for rocking movement, fore and aft and laterally, by the provision of the usual ball 34b and cooperating socket 34c, in order that it may be tilted or canted from its normal or neutral position through the requisite arcs to enter its toe 34a between the upwardly directed jaws of the respective slide rods in the pre-selected gear actuating movements of the shift lever as hereinafter more specifically set forth. These jaws may be of any practical design. However, in the present construction, as shown in Fig. 1, the jaw associated with the slide rod 42, to which those on rods 31 and 38 structurally correspond, comprises the longitudinally spaced abutments 45 and 46 integral with the base 47 conforming to the contour of the rod 42 and complemental to the cooperating fork head 48 to which it may be connected, as by bolts 49 to clamp the fitting to the rod for engagement by the toe 34a as aforesaid, the range of reciprocal movement of the rod in either direction being determined by the entrance of the spring-actuated latch 50 into one of the slide recesses or notches 51 and 52.

From the foregoing, it will be manifest that the movement of the lever 34 from its substantially vertical neutral position to the left will cause its toe 34a to engage the jaw member 38a of rod 38, the forward movement of said lever when so engaged propelling the rod backward to engage gear 36 with gear 21 for first speed, the backward movement of said lever, while still canted to the left, disengaging gear 36 from 21 and meshing gears 37 with counter-shaft gear 20.

Similarly the forward movement of the shift lever, when tilted to the right from neutral to enter the jaw 31a will actuate the slide rod 31 in the opposite direction to engage the teeth 28a of gear 28 with gear 23, the following backward movement of said lever disengaging the gear 28 from the countershaft gear 23 and meshing the internal teeth 29 of said gear 28 with the drive shaft pinion 11, thus directly coupling the alined shafts 10 and 12. The various positions to which the lever 34 is moved for establishing the trains of power transmission for first, second, third and fourth speeds, as just described, are shown in the diagram depicted in Fig. 4, which it will be noted conforms to the standard arrangement.

As will be observed, the gear shift lever 34, above the toe 34a is provided with a lug 53—53a which is normally disposed within the slot or ways 54 of the plate 55 suitably fixed to the lever mounting 7a, under the influence of the spring 56 retained between the cap 57 and the lever-embracing collar 58, the spring functioning to urge the lever upwardly and retain the ball 34b in its normal position within its socket 34c, when the lever is in neutral and during its actuation through the several movements heretofore described in meshing the respective gears for obtaining first, second, third and fourth speeds, the width of the slot or ways 54 being sufficient to permit of the lever lug 53—53a traversing the same when the lever is canted to the left or right, for engaging the jaws 38a and 31a and actuating the rods to which they are respectively clamped, as heretofore described.

Now, when it is desired to mesh the gears for the overspeed drive, the lever 34, as will be evident from the shift diagram, must be rocked to the right, beyond the position which it assumes for fourth speed, and backward. Since the ways or slot 54 of the plate 55 in conjunction with the lug 53—53a, normally limit the degree of lateral arcuate movement of the lever 34, as heretofore explained, in order to obtain the greater range of lever movement that is essential to enter the toe 34a between the jaws 45 and 46 of the rod 42 (Fig. 1) the lever is depressed in opposition to the spring 56, simultaneously producing a like movement of the ball 34b in its socket 34c and locating the lug 53—53a below the plane of the slot defining portions or flanges 59 and 60 of the plate 55. As will be evident, the canting of the lever in this depressed position will permit the contiguous surface 53 of the lug to enter beneath the flange 59 and to ride thereunder as the lever is manipulated to urge the slide rod 42 forwardly until the latch 50 enters the rear notch or recess 52 thereof, in which position the gear 41 is engaged with the countershaft gear 22, the power being transmitted from the drive shaft pinion 11 to the countershaft gear 19, in constant mesh therewith, and from the aforesaid gear 22 to the gear 41 on the driven shaft. The lug 53—53a, of course, remains below the plane of the plate flanges during the period in which the overspeed gears are engaged, it being obvious that, in shifting from the overspeed drive to pick up another forward speed or to set the lever at neutral, the spring 56 will effect the return of the lever to its normal operating position, with the lug 53—53a again disposed within the slot or ways 54.

Any preferred construction of ball and socket connection between the lever 34 and its mount that will admit of vertical movement of the lever as described may be employed, it being manifest that a suitable stop to limit the downward movement of the lever should be incoporated in the construction. In the present showing, a pin 34d, seated in the housing 7a, is adapted to engage the head of the peripheral slot or recess 34e of the ball 34b to arrest the downward movement of said lever as will be clearly evident from the structure illustrated in Fig. 3. In lieu of this arrangement, the extent of the downward movement of the lever may be fixed by the depth of the jaws with which it is engageable in its depressed position, or in any other appropriate manner.

For setting the gears of my transmission for reverse speed, wherein the double gear idler 26, 27 is engaged with the driven shaft gear 36 and the gear 21 on the countershaft 18, the manipulation of the shift lever 34 is similar to that which is required for setting the gears for the fifth or overspeed, except that for reverse the lever must be canted to the left as it is depressed against the spring 56 to permit the lug 53—53a to enter beneath the flange 60 of the guideway plate 55, the lever movement as shown by the diagram being to the extreme left and back.

With the toe 34a engaged with the jaw 61a of the slide 61 by the initial movement of the lever in its depressed position, the backward movement thereof will actuate the slide in the reverse direction and effect a corresponding forward movement of the idler upon its stub shaft 24 to mesh the portions 26 and 27 thereof with the gears 36 and 21, as previously stated, the transmission being from the driving pinion 11 to the countershaft gear 19 and gear 21 on the latter shaft to the larger diameter section 26 of the idler gear, and from the smaller diameter idler section 27 to the driven shaft gear 36, which, as will be apparent will rotate in a direction opposite to that in which it travels when functioning in the first forward speed.

As will be noted, the reverse idler actuating system differs from that employed for setting the other movable gears of the transmission mechanism, the open jaw 61a engageable by the shift lever toe 34a being formed at one end of an arm 62, preferably integral with the fitting 63, adapted to be rigidly fixed to the rod 61, as by a bolt 64. This fitting also preferably includes a rearwardly depending offset link or lever 65 connected to a second clamp fitting 66, as by a pin and clevis, indicated at 67, which embraces the slide 68 reciprocable in the longitudinally spaced bearings 69 and 70, the idler being engaged by a fork (indicated at 71 in dotted lines in Fig. 2) the stem 72 of which extends substantially horizontally from the latter fitting 66.

From the preceding description of my invention, it will be manifest that I contemplate changes in structural details thereof and in the arrangement of the cooperating parts, in attaining the objectives to which it is directed, my invention possessing characteristics, as pointed out, whereby it responds in every way to existing demands of motor vehicle engineering and operation, not only with respect to road vehicles as trucks, buses and other passenger carriers, but to rail vehicles of those types in which transmission units are employed. As an example, attention may be directed to the interchangeability of a transmission mechanism embodying the novel features of my invention with those of standard design, which will permit of the conversion of a so-called three or four speed vehicle into a five speed drive, it being evident that by conforming my shift lever movements to those of the standard diagram it possesses a wide range of utility in this important field.

I claim:

1. In a change speed transmission having gearing, a mechanism for shifting certain gears thereof to engage coacting gears in producing different speed ratios, said mechanism including four slides each embodying a jaw, a shift lever having a dependent-jaw-engaging toe mounted on said transmission for movement in the direction of its longitudinal axis and for arcuate fore and aft and lateral movement, said lever having oppositely directed integral lateral extensions, fixed means adapted to cooperate with each of said extensions to limit the lateral arcuate movement of said lever under pre-determined operating conditions, to render said toe engageable only with the jaws of two of said slides, the movement of said lever on its longitudinal axis in one of two directions, permitting of the shifting of said lever laterally through an arc greater than that to which it is limited by said extensions and their respective cooperating means, whereby said toe may be engaged with the jaw of a pre-determined one of the remaining slides and moved through an intersecting arc to actuate said slide longitudinally.

2. In a change speed transmission having gearing, a mechanism for shifting certain gears thereof to engage coacting gears in producing different speed ratios, said mechanism including four slides each embodying a jaw, a shift lever, a mounting therefor, a spring for normally supporting said lever in a pre-determined relationship to said mounting, said lever being provided with oppositely directed lateral extensions, fixed means adapted to cooperate with the respective extensions when said lever is in its normally supported position in said mounting for limiting the lateral arcuate movement of said lever to render it engageable only with the jaws of the two intermediate slides, said lever being movable in opposition to said spring to render said extensions and cooperating means non-effective to permit of the lateral movement of said lever through an arc to engage the jaw of a pre-selected one of either of the two remaining slides.

3. In a change speed gear transmission having five forward speeds and reverse speed the combination of means for functioning said transmission in a preselectable one of said speeds, said means including gear-shifting mechanism embodying four slide rods, each having a jaw, a shift lever adapted for engagement with the jaws of each of said slide rods, said lever being mounted for arcuate movement fore and aft and laterally of said transmission, devices rigid with said lever and said housing for limiting the lateral rocking movement of said lever for engagement only with the respective jaws of either of two intermediate slide rods whereby said transmission may be preselectably conditioned for functioning in one of four of the aforesaid five like directional speeds and means associated with said lever to permit of movement thereof on its longitudinal axis to render the limiting devices on said housing non-effective, relative to the devices on said lever whereby said lever may be rocked laterally through an arc to engage with the jaws of either of the two remaining slide rods, to condition said transmission for functioning in the fifth speed or in the reverse speed, as may be preselected.

4. In a transmission gearing, the combination of four shift slides operable to effect gear changes for five forward speeds and a reverse speed, the slides effective in producing four of the forward speeds being intermediate of those for obtaining the fifth forward and the reverse speeds, a selecting and gear shifting lever provided with a toe engageable with each of said four slides, a mounting for said lever to permit of lateral and fore and aft movement of said lever for the engagement and actuation of either of the two intermediate slides, fixed means on said mounting for limiting the lateral arcuate movement of said lever to the engagement of either of said intermediate slides, and means associated with said lever and said mounting for rendering said lever bodily movable on its longitudinal axis to permit of an increased arcuate movement of said lever on a transverse axis below that of its normal arcuate movement for engagement with one or the other of the remaining two slides, said limiting means functioning to retain said lever in association with the slide with which it is engaged.

5. In a change speed transmission for motor vehicles and the like, having five forward speeds and a reverse speed, a gear shifting lever, a mounting therefor, means interconnecting said lever and said mounting for rocking movement of said lever on intersecting transverse axes, for conditioning said transmission for functioning in a preselected one of any of said six speeds, means associated with said lever and said mounting coacting to limit the rocking of said lever from neutral to the left for movement forward for first speed or to the rear for second speed, to the right of neutral for forward movement for third speed or rearward for fourth speed, and means yieldable cooperating with said mounting and said lever to maintain said lever in a predetermined relationship to said mounting for the performance of the aforesaid rocking movements, said lever being depressible in opposition to said yieldable means and relatively to said mounting, when in neutral position, to render said limiting means ineffective and increase its rocking range to the right for backward movement for the fifth speed or to the left of neutral and rearward for reverse speed, as may be preselected.

6. The combination with a change speed transmission having coacting gears for producing five forward speeds and one reverse speed, of means for conditioning said transmission for functioning in a preselected one of said speeds, said means including four parallel slide rods, each embodying a jaw, a lever having a jaw-engaging element rigid therewith, a mounting for said lever above said rods, means for supporting said lever in said mounting for rocking on intersecting transverse axes, yieldable means associated with said mounting and said lever to render said lever movable in the direction of its longitudinal axis, relatively to said mounting, means limiting the rocking of said lever from neutral to the left to engage said element in the jaw of one of the intermediate rods for its forward movement for first speed and backward for second speed, means limiting the rocking of said lever to the right of neutral for engaging said element within the jaw of the other intermediate rod for its forward movement for third speed or backward for fourth speed, said limiting means being rendered ineffective in response to the depression of said lever in opposition to said yieldable means to increase its range of rocking movement to the right to enter said element in the jaw of one outer rod for backward movement for fifth speed and to the left for engagement within the jaw of the other outer rod, for rearward movement for reverse speed, as may be preselected, the respective limiting means cooperating with said lever upon the initiation of one or the other of the latter two conditioning operations to retain said lever in its depressed position, with its jaw-engaging element in engagement with the jaw in which it is then entered.

7. The combination with a change speed transmission having coacting gears for producing five forward speeds and one reverse speed, of means for conditioning said transmission for functioning in a preselected one of such speeds, said means including four gear-shifting rods, certain of said rods being actuatable for conditioning said transmission for operation in first, second, third and fourth speeds, others thereof being shiftable for operation of the transmission in fifth speed forward and the reverse speed, a single gear-shifting lever embodying a relatively immovable element engageable with each of said rods, a mounting for said lever, means carried by said lever and coacting with said mounting to render said lever capable of fore and aft and lateral arcuate movement on intersecting transverse axes, yieldable means associated with said mounting and said lever to support said lever in a predetermined actuating position relatively to said mounting, devices carried by said lever and means in fixed association with said mounting adapted to cooperate to limit the lateral arcuate movement of said lever to render said rod-engaging element engageable only with the rods effective in the conditioning of the transmission for operation in first, second, third and fourth speeds, said lever being bodily shiftable relatively to said mounting and in opposition to said yieldable means to render said limiting means non-effective and increase the range of lateral movement thereof for effecting the engagement of said rod-engaging element with either of the rods for conditioning the transmission for functioning in the two remaining speeds, the devices carried by said lever engaging with said fixed means on said mounting to retain the lever in either of its two latter rod-engaging positions.

BENJAMIN B. BACHMAN.